United States Patent
Rura

[19]

[11] Patent Number: 6,027,137
[45] Date of Patent: Feb. 22, 2000

[54] BABY CARRIAGE WITH COOLING MECHANISMS

[76] Inventor: Joan Rura, Rd. #1, Box 572, Rte. 119, Blairsville, Pa. 15717

[21] Appl. No.: 09/131,356

[22] Filed: Aug. 10, 1998

[51] Int. Cl.[7] ........................................................ B62B 1/00
[52] U.S. Cl. ...................... 280/650; 62/261; 261/DIG. 3; 280/658; 280/47.38; 297/184.13
[58] Field of Search .......................... 297/184.13, 184.14; 62/261, 244, 245, 312, 314, 331, 531; 135/16, 33.7, 94, 96, 98; 280/647, 650, 658, 47.38; 261/DIG. 3, 28, 92

[56] References Cited

U.S. PATENT DOCUMENTS

| | | | |
|---|---|---|---|
| 2,247,028 | 6/1941 | Kuntz | 62/261 |
| 2,547,896 | 4/1951 | Wellen | 135/16 X |
| 2,966,046 | 12/1960 | Wright | 62/314 X |
| 3,548,415 | 12/1970 | Waters | 62/314 X |
| 3,834,680 | 9/1974 | Yost et al. | 261/92 |
| 4,314,727 | 2/1982 | Potts | 297/184.13 |
| 5,560,219 | 10/1996 | Vegara | 62/245 X |
| 5,725,356 | 3/1998 | Carter | 416/240 |

Primary Examiner—Michael Mar

[57] ABSTRACT

A baby carriage with cooling mechanisms including a baby carriage having a container for receiving a baby. The carriage also has four wheels secured therebelow and a handle for use by a child care provider for pushing the carriage and baby. The carriage also has a canopy positioned over one end of the carrier for shielding the face of an infant therewithin from the sun. The carriage also has a rectangular housing secured within a similarly sized rectangular aperture in the canopy. The housing includes an upwardly extending rectilinear support with a lid slidably coupled to the support to selectively conceal and expose the interior of the housing. The housing has an upper end and a lower end. A fan is provided with a fan motor and a drive shaft vertically disposed and secured within the housing adjacent to the lower end with rotatable fan blades secured to the drive shaft with a source of potential for selectively energizing the fan motor and fan.

1 Claim, 2 Drawing Sheets

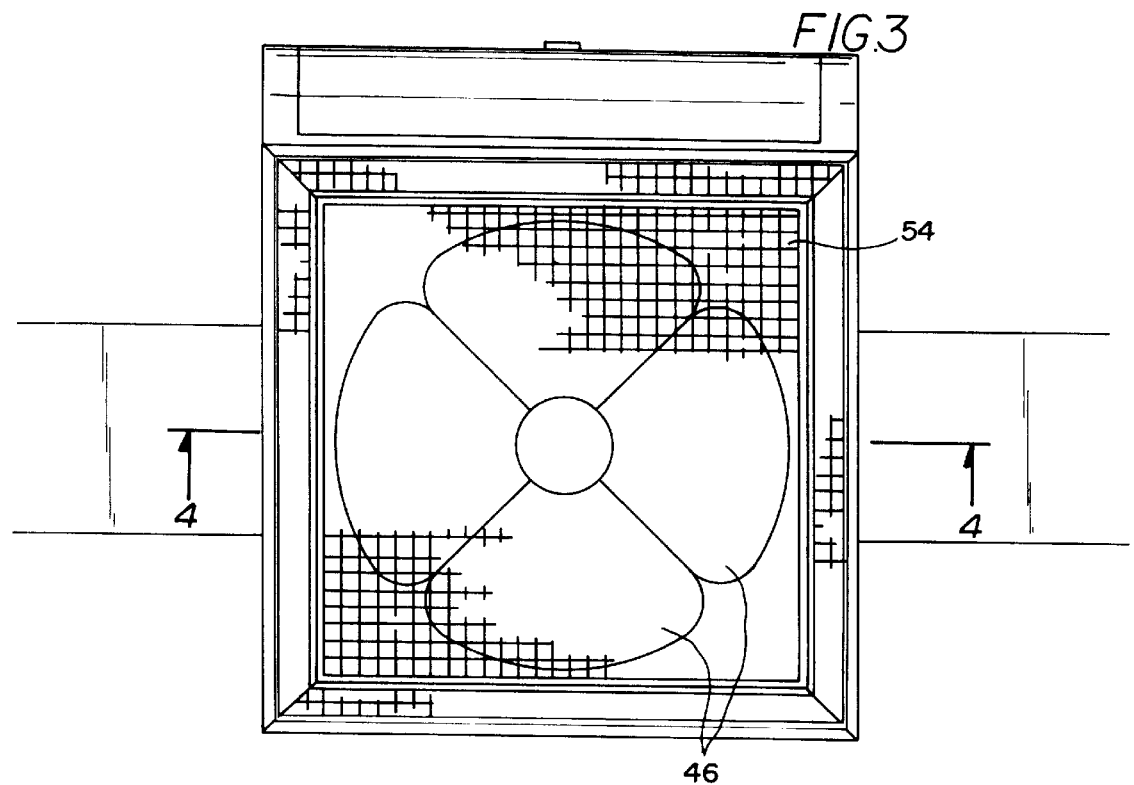
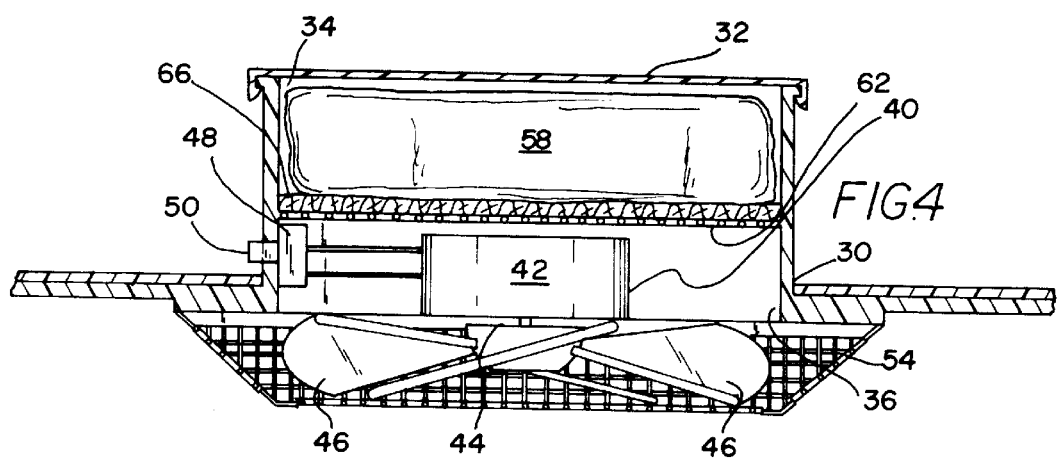

BABY CARRIAGE WITH COOLING MECHANISMS

BACKGROUND OF THE INVENTION

1. Field of the Invention

The present invention relates to a baby carriage with cooling mechanisms and more particularly pertains to providing cooling air to a baby in a carriage for increased comfort.

2. Description of the Prior Art

The use of baby carriages and cooling devices of known designs and configurations is known in the prior art. More specifically, baby carriages and cooling devices of known designs and configurations heretofore devised and utilized for the purpose of increasing the comfort of babies through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,839,106 to Steiner, issued Jun. 13, 1989 discloses a portable misting fan. U.S. Pat. No. 5,338,495 to Steiner et al., issued Aug. 16, 1994 discloses a portable misting fan. U.S. Pat. No. 5,620,633 to Junkel et al., issued Apr. 15, 1997 discloses a spray misting device for use with a portable sized fan. U.S. Pat. No. 5,667,732 to Lederer, issued Sep. 16, 1997 discloses a compact portable misting fan. Lastly, U.S. Pat. No. Des. 328,949 to Rodrigue, Jr., issued Aug. 25, 1992 discloses a baby stroller fan. Also of interest is foreign patent EP 0 552 678 A1 to Ferruccio, Issue/Priority Date Jan. 15, 1993 which discloses an awning for carriage, stroller or the like.

In this respect, the baby carriage with cooling mechanisms according to the present invention substantially departs from the conventional concepts and designs of the prior art, and in doing so provides an apparatus primarily developed for the purpose of providing cooling air to a baby in a carriage for increased comfort.

Therefore, it can be appreciated that there exists a continuing need for a new and improved baby carriage with cooling mechanisms which can be used for providing cooling air to a baby in a carriage for increased comfort. In this regard, the present invention substantially fulfills this need.

SUMMARY OF THE INVENTION

In view of the foregoing disadvantages inherent in the known types of baby carriages and cooling devices of known designs and configurations now present in the prior art, the present invention provides an improved baby carriage with cooling mechanisms. As such, the general purpose of the present invention, which will be described subsequently in greater detail, is to provide a new and improved baby carriage with cooling mechanisms and method which has all the advantages of the prior art and none of the disadvantages.

To attain this, the present invention essentially comprises a new and improved baby carriage with cooling mechanisms for providing cooling air to a baby in a carriage for increased comfort comprises a baby carriage having a container for receiving a baby and with four wheels secured therebelow and with a handle for use by a child care provider for pushing the carriage and baby and a canopy positioned over one end of the carrier for shielding the face of an infant therewithin from the sun. Also provided is a rectangular housing secured within a similarly sized rectangular aperture in the canopy, the housing including an upwardly extending rectilinear support with a lid slidably coupled with respect thereto. The support is provided to selectively conceal and expose the interior of the housing. The housing has an upper end and a lower end. Additionally provided is a fan with a fan motor and a drive shaft vertically disposed and secured within the housing adjacent to the lower end with rotatable fan blades secured to the drive shaft with a source of potential and an on/off switch for selectively energizing the fan motor and fan. A screen is secured to the housing beneath the fan for protecting against injury from the fan when rotating. A cold pack of material adapted to be cooled at a remote location and then placed within the housing adjacent to the upper end thereof for cooling the air thereadjacent. A layer of mesh is located within the housing above the fan and beneath the cold pack to provide a support. Lastly provided is a layer of absorbent material resting on the mesh to absorb moisture from the cold pack whereby when the on/off switch is energized to activate the fan, to allow circulation of cool air onto a baby within the carrier of the carriage.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved baby carriage with cooling mechanisms which has all of the advantages of the prior art baby carriages and cooling devices of known designs and configurations and none of the disadvantages.

It is another object of the present invention to provide a new and improved baby carriage with cooling mechanisms which may be easily and efficiently manufactured and marketed.

It is further object of the present invention to provide a new and improved baby carriage with cooling mechanisms which is of durable and reliable constructions.

An even further object of the present invention is to provide a new and improved baby carriage with cooling mechanisms which is susceptible of a low cost of manufacture with regard to both materials and labor, and which accordingly is then susceptible of low prices of sale to the consuming public, thereby making such baby carriage with cooling mechanisms economically available to the buying public.

Even still another object of the present invention is to provide a baby carriage with cooling mechanisms for providing cooling air to a baby in a carriage for increased comfort.

Lastly, it is an object of the present invention to provide a new and improved baby carriage with cooling mechanisms including a baby carriage having a container for receiving a baby. The carriage also has four wheels secured therebelow and a handle for use by a child care provider for pushing the carriage and baby. The carriage also has a canopy positioned over one end of the carrier for shielding the face of an infant therewithin from the sun. The carriage also has a rectangular housing secured within a similarly sized rectangular aperture in the canopy. The housing includes an upwardly extending rectilinear support with a lid slidably coupled with respect thereto, the support to selectively conceal and expose the interior of the housing. The housing has an upper end and a lower end. A fan is provided with a fan motor and a drive shaft vertically disposed and secured within the housing adjacent to the lower end with rotatable fan blades secured to the drive shaft with a source of potential for selectively energizing the fan motor and fan.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a bottom elevational view of the cooling mechanisms shown in FIG. 2.

FIG. 4 is a cross-sectional view taken along line 4—4 of FIG. 3.

The same reference numerals refer to the same parts through the various Figures.

DESCRIPTION OF THE PREFERRED EMBODIMENT

Figure 1:
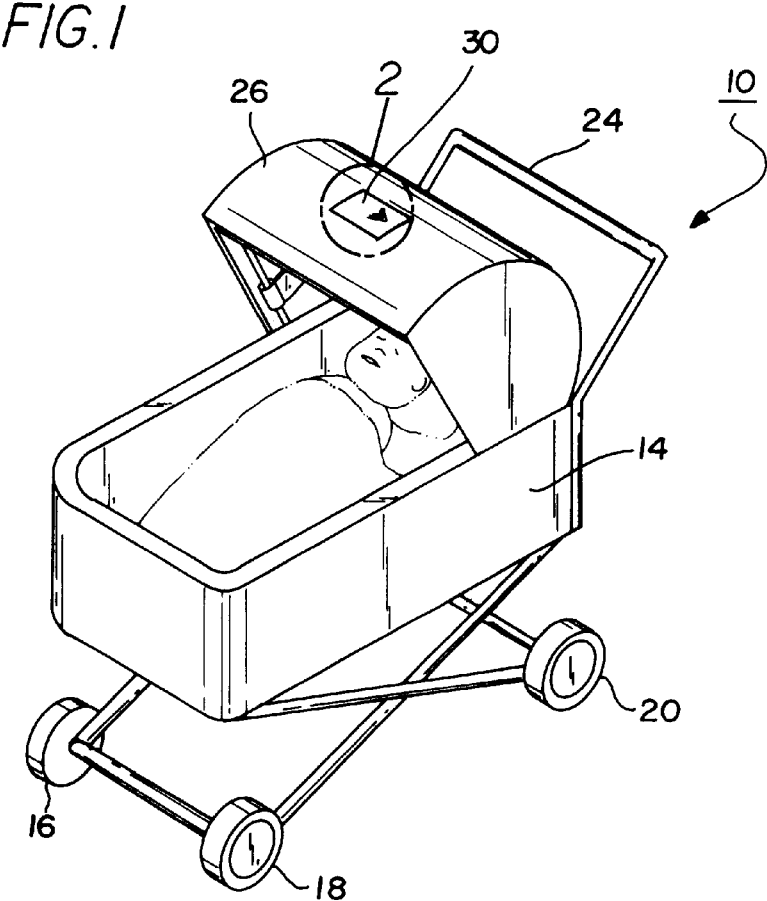
FIG. 1 is a perspective view of the preferred embodiment of the baby carriage with cooling mechanisms constructed in accordance with the principles of the present invention.
Figure 2:
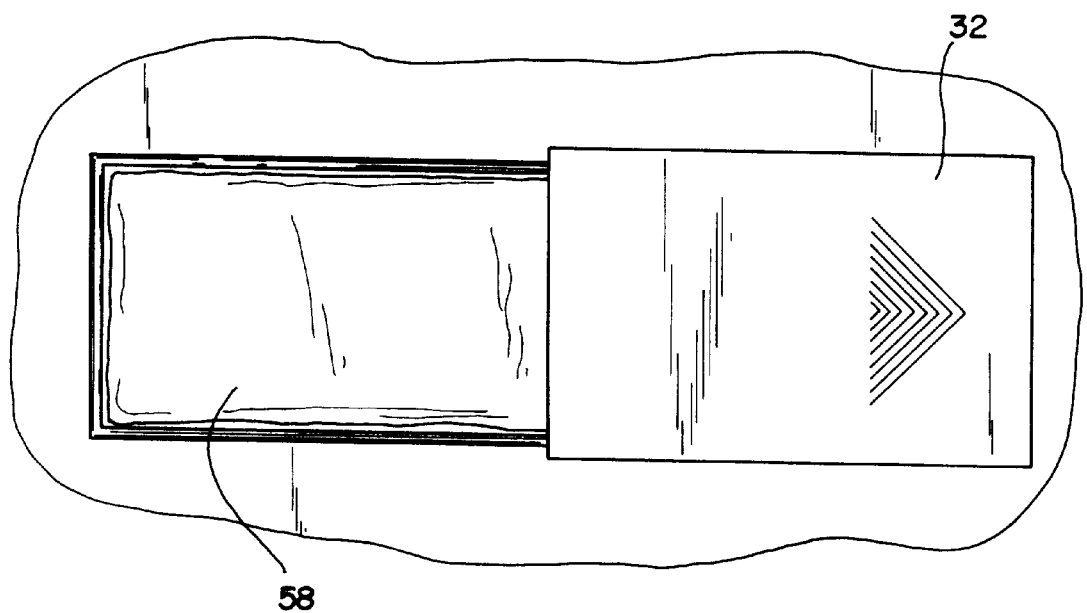
FIG. 2 is an enlarged top view of the cooling mechanisms taken at Circle 2 of FIG. 1.

With reference now to the drawings, and in particular to FIG. 1 thereof, the preferred embodiment of the new and improved baby carriage with cooling mechanisms embodying the principles and concepts of the present invention and generally designated by the reference numeral 10 will be described.

The present invention, the baby carriage with cooling mechanisms 10, is comprised of a plurality of components. Such components are individually configured and correlated with respect to each other so as to attain the desired objective.

The new and improved baby carriage 10 with cooling mechanisms for providing cooling air to a baby in a carriage for increased comfort comprises a baby carriage having a container 14 for receiving a baby and with four wheels 16, 18, 20, 22 secured therebelow and with a handle 24 for use by a child care provider for pushing the carriage and baby and a canopy 26 positioned over one end of the carrier for shielding the face of an infant therewithin from the sun.

Also provided is a rectangular housing 30 secured within a similarly sized rectangular aperture in the canopy, the housing including an upwardly extending rectilinear support with a lid 32 slidably coupled with respect thereto. The support is provided to selectively conceal and expose the interior of the housing. The housing has an upper end 34 and a lower end 36.

Additionally provided is a fan 40 with a fan motor 42 and a drive shaft 44 vertically disposed and secured within the housing adjacent to the lower end with rotatable fan blades 46 secured to the drive shaft with a source of potential 48 and an on/off switch 50 for selectively energizing the fan motor and fan.

A screen 54 is secured to the housing beneath the fan for protecting against injury from the fan when rotating.

A cold pack of material 58 adapted to be cooled at a remote location and then placed within the housing adjacent to the upper end thereof for cooling the air thereadjacent.

A layer of mesh 62 is located within the housing above the fan and beneath the cold pack to provide a support.

Lastly provided is a layer of absorbent material 66 resting on the mesh to absorb moisture from the cold pack whereby when the on/off switch is energized to activate the fan, to allow circulation of cool air onto a baby within the carrier of the carriage.

The baby carriage as described hereinabove is a carriage or stroller which has a fan built into the retractable hood which covers the baby. This product will enable the parents to have a baby or small child outside in hot, humid weather and still keep the child cool and comfortable. When the user wants to turn on the fan in the baby carriage he or she simply pulls down the hood, opens a sliding plastic door, inserts a cold pack into the compartment above the fan, and flips the switch to turn on the fan. The air is then cooled and blown under the hood into the carriage or stroller keeping child cool. The closed hood keeps the cooler air inside the carriage or stroller. The fan helps keep the child from overheating and getting cranky. The retractable hood will either keep cool air in on hot days or warm air in on cold days.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A baby carriage with a cooling mechanism for providing cooling air to a baby in a carriage for increased comfort comprising, in combination:

a carriage having a container for receiving a baby, four wheels secured therebelow, a handle for pushing the carriage, and a canopy positioned over one end of the container for shielding the face of an infant therewithin from the sun;

a rectangular housing secured within a similarly sized rectangular aperture in an upper end of the canopy, the housing including an upwardly extending rectilinear support having an open upper end forming an air inlet opening and an open lower end forming an air outlet opening;

a fan assembly including a fan motor having a drive shaft vertically disposed and secured within the housing adjacent to the air outlet opening, rotatable fan blades secured to the drive shaft, and an on/off switch for selectively energizing the fan motor by connecting the fan motor to a source of electric power;

a screen secured to the housing beneath the fan blades for protecting the baby against injury from the fan blades when rotating;

a cold pack of material adapted to be cooled at a remote location and then placed within the housing adjacent to the air inlet opening for cooling the air flowing into the housing;

a layer of mesh within the housing positioned above the fan and below the cold pack of material to provide a support;

a layer of absorbent material resting on the mesh and directly beneath the cold pack of material for absorbing moisture from the cold pack of material; and a lid slidably coupled to the open upper end of the housing to selectively open and close the air inlet opening for permitting entry and removal of the cold pack of material and for controlling the flow of air into the housing, whereby the on/off switch is switched to an on position to energize the fan motor for drawing air through the air inlet opening and into the housing where the air is cooled by the cold pack of material and the layer of absorbent material and then directed downwardly into the container.

\* \* \* \* \*